(12) United States Patent
Maile

(10) Patent No.: US 11,716,972 B2
(45) Date of Patent: Aug. 8, 2023

(54) FLOATING SEAWEED CLIP

(71) Applicant: Alex J. Maile, Avon, MN (US)

(72) Inventor: Alex J. Maile, Avon, MN (US)

( * ) Notice: Subject to any disclaimer, the term of this patent is extended or adjusted under 35 U.S.C. 154(b) by 0 days.

(21) Appl. No.: 16/773,381

(22) Filed: Jan. 27, 2020

(65) Prior Publication Data

US 2021/0259217 A1    Aug. 26, 2021

(51) Int. Cl.
*A01K 61/85*          (2017.01)

(52) U.S. Cl.
CPC .................................... *A01K 61/85* (2017.01)

(58) Field of Classification Search
USPC ....... 119/200, 210, 212, 230, 245, 246, 247, 119/269, 51.04; D30/101, 102, 103, 106, D30/104; 47/1.4
See application file for complete search history.

(56) References Cited

U.S. PATENT DOCUMENTS

| 2,711,714 | A |   | 6/1955  | Timeus |
| 2,761,422 | A | * | 9/1956  | Martin .................... A01K 61/85 119/51.04 |
| 2,852,173 | A | * | 9/1958  | Milner, Sr. ............. A01K 65/00 224/103 |
| 3,095,852 | A |   | 7/1963  | Goldman |
| 3,512,505 | A |   | 5/1970  | Cross et al. |
| 3,664,303 | A |   | 5/1972  | Baensch |
| 3,939,802 | A |   | 2/1976  | Neff |
| 3,993,028 | A |   | 11/1976 | Baensch et al. |
| 4,086,161 | A | * | 4/1978  | Burton ...................... C02F 3/10 210/602 |
| 4,237,646 | A | * | 12/1980 | Mims, III .............. A01K 69/06 43/10 |
| 4,328,916 | A | * | 5/1982  | Lucas .................... A01K 65/00 224/103 |
| 5,528,856 | A | * | 6/1996  | Smith ..................... C02F 3/327 47/59 R |
| 5,778,824 | A |   | 7/1998  | Musgrave et al. |
| 6,070,554 | A |   | 6/2000  | Wilson |
| 6,109,210 | A |   | 8/2000  | Nasser |
| 7,273,020 | B2 | * | 9/2007 | Montoya ................ A01K 61/85 119/245 |
| 7,699,277 | B2 |   | 4/2010 | Bagnall |
| 9,089,116 | B2 |   | 7/2015 | Tuan et al. |
| 10,405,525 | B2 |   | 9/2019 | Yim |
| 2007/0266954 | A1 |   | 11/2007 | Chapman |

(Continued)

FOREIGN PATENT DOCUMENTS

DE    10-2004-032855    2/2006

OTHER PUBLICATIONS

Floating Fish Food and Algae Clip, downloaded from the internet on May 1, 2020, at https://www.saltwateraquarium.com/floating-fish-food-algae-clip-zoo-med/?gclid=EAIaIQobChMIkZXMsIyT6QIVDdbACh0ZmgGEEAQYASABEgK3MPD_BwE, by Saltwater Aquarium.com, 1685 Fairfield Road, Suite C, Gettysburg, PA 17325, 2018.

(Continued)

*Primary Examiner* — Andrea M Valenti

(74) *Attorney, Agent, or Firm* — Greenberg Traurig, LLP

(57) ABSTRACT

Aquarium feeding systems are disclosed. In one embodiment, a system (10) includes a flotation base (20) adapted to float on water and a clip (130) adapted to be removably inserted into and removed from the flotation base (20). The clip may hold food materials (e.g., seaweed) for feeding aquatic life of the aquarium.

8 Claims, 4 Drawing Sheets

(56) References Cited

U.S. PATENT DOCUMENTS

| | | |
|---|---|---|
| 2009/0250011 A1 | 10/2009 | Biggs |
| 2011/0247262 A1* | 10/2011 | Lee .................. C12M 23/14 47/1.4 |
| 2012/0110890 A1* | 5/2012 | Garrett .................. A01K 97/20 43/55 |
| 2013/0174786 A1 | 7/2013 | Bagnall |
| 2018/0184690 A1 | 7/2018 | Andrew |

OTHER PUBLICATIONS

Fishuel Aquarium Feeding Ring Floating Rings Food Feeder, downloaded from the internet on May 1, 2020, at https://www.amazon.com/Fischuel-Aquarium-Feeding-Floating-Suction/dp/B07X9B8WJ4.

International Search Report and Written Opinion, dated Jun. 3, 2021, from related International Patent App. No. PCT/US2021/014906.

"POPETPOP Aquarium Feeder Cone—2pcs Bloodworm Feeder Cone Floating Fish Feeder, Fish Tank Feeding Cup Plastic Cone Basket", retrieved from the internet Mar. 29, 2021 at URL+https://www.amaxon.com/POPETPOP-Aquarium-Cone-2pcs-Bloodworm-Floating/dp/B307SWHP43J.

* cited by examiner

FLOATING SEAWEED CLIP

BACKGROUND

Apparatus for feeding aquatic life in aquariums are known. For instance, U.S. Pat. Nos. 2,711,714 and 2,761,422 describe apparatus for feeding aquatic life in aquariums. However, such systems offer poor aquatic viewing experiences and do not facilitate ready supply of aquatic food within a predefined space.

SUMMARY OF THE INVENTION

Briefly, the present disclosure relates to modular aquarium feeding systems. The systems generally include a flotation base. The systems also include a feeding apparatus adapted to be repeatedly inserted into and removed from the flotation base. In one embodiment, the feeding apparatus comprises a clip. At least a portion of the feeding apparatus may be located above a water level of the aquarium to facilitate ready removal of thereof while keeping a user's hands dry, i.e., the water of the aquarium may not contact the user's hands during placement of the food. The systems may float freely about the aquarium while also containing the food thereby facilitating ready recognition of where aquatic feeding will occur, thereby enhancing/improving the aquarium viewing experience.

DETAILED DESCRIPTION

Figure 1:
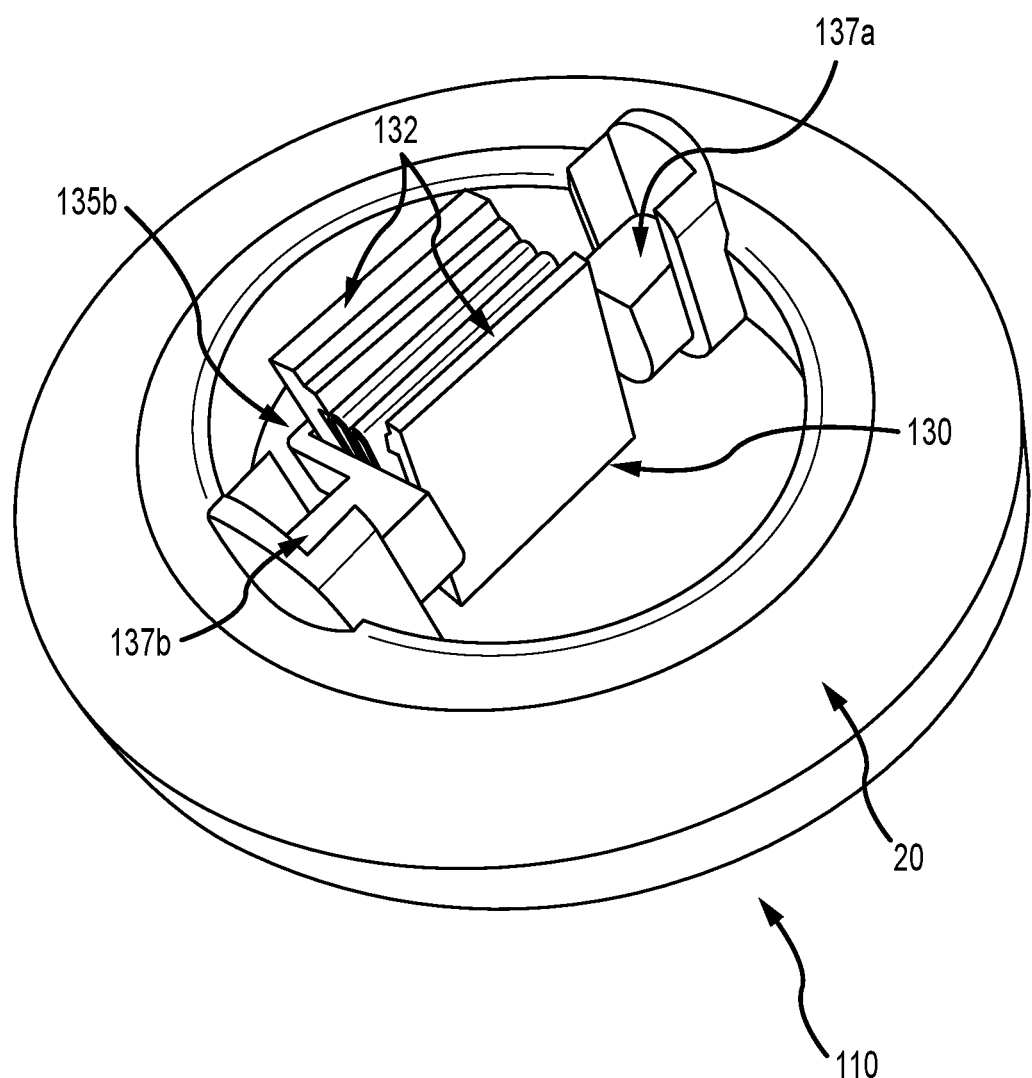
FIG. 1 is a perspective view of a first embodiment of an aquarium feeding system.
Figure 2:
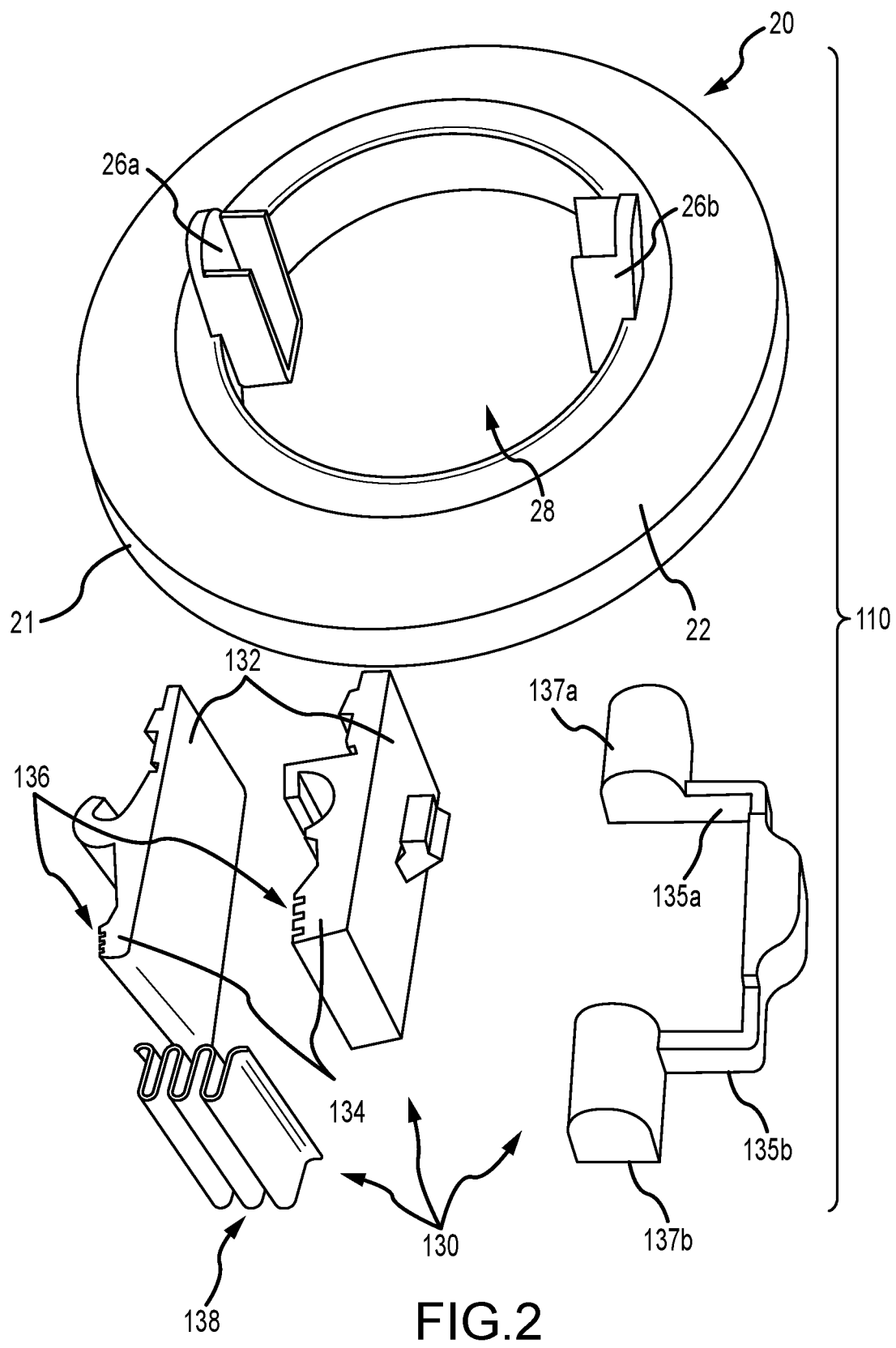
FIG. 2 is a perspective view of a disassembled version of the system of FIG. 1.

Reference is now made to various figures of the application, which illustrate various non-limiting embodiments of the novel and inventive aquarium feeding systems and apparatus described herein.

Referring now to FIGS. 1-4, one embodiment of an aquarium feeding system (110) is illustrated. In the illustrated embodiment, the system (110) includes (a) a flotation base (20) that is adapted to float on water, and (b) a clip (130) that mates with the flotation base (20). As described in further detail below, the flotation base (20) generally provides buoyancy for the system. As described in further detail below, the clip (130) is adapted to be removably inserted into and removed from the flotation base (20). In operation, the flotation base (20) and the clip (130) are placed in an aquarium filled with water. Seaweed (e.g., Nori) or other suitable food material(s) is placed in the jaws (134) of the clip (130), which clip (130) is then inserted into the flotation base (20). The clip (130) is sufficiently tall such that top portions rise above the water level of the aquarium. Accordingly, the clip (130) can be removed from the flotation base (20) to reload seaweed or other suitable food material(s) and without wetting of the user's hands. Moreover, the exact place and location of where the seaweed will reach the aquatic life is known (i.e., where the system (110) is located), enhancing the aquarium viewing experience of the users. The system (110) also generally floats freely around the aquarium via flotation base (20), so the aquatic food may be randomly distributed with each feeding, also enhancing the viewing experience of the users.

i. The Flotation Base

As shown in FIGS. 1-4, the flotation base (20) comprises an outer perimeter and an inner opening (28). The outer perimeter (21) of the flotation base (20) comprises an upper surface (22) and a lower surface (24). Slots (26) are provided in the upper surface (22) for receiving corresponding arms (135a, 135b) of the clip (130). The opening (28) of the flotation base (20) is sized to receive the clip (130) such that the clip (130) sits within the flotation base (20). In the illustrated embodiment, the flotation base (20) is in the form of a tube.

ii. The Clip

As shown in FIGS. 1-4, the clip (130) comprises arms (135a, 135b) adapted to be inserted into corresponding slots (26a, 26b) of the flotation base (20). In the illustrated embodiment, a first arm (135a) sits within a first slot (26a) of the flotation base via first outer end (137a). A second arm (135b) sits within a second slot (26b) of the flotation base (20) via second outer end (137b). Handles (132) are disposed above a plane corresponding to the upper surface (22) of the floatation base (20). Jaws (34) are disposed at or below a plane corresponding to the lower surface (24) of the flotation base (20) for provision of food materials to aquatic life of the aquarium.

Figure 3:
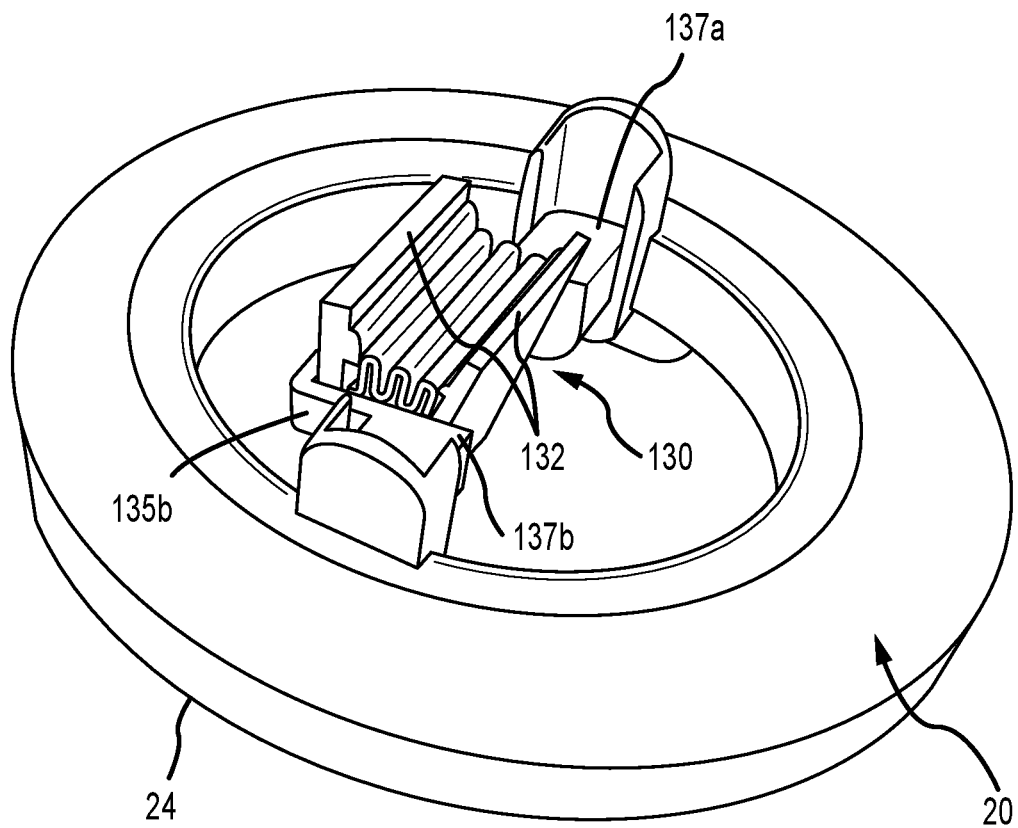
FIG. 3 is a perspective view of the embodiment of FIG. 1, in a different color.
Figure 4:
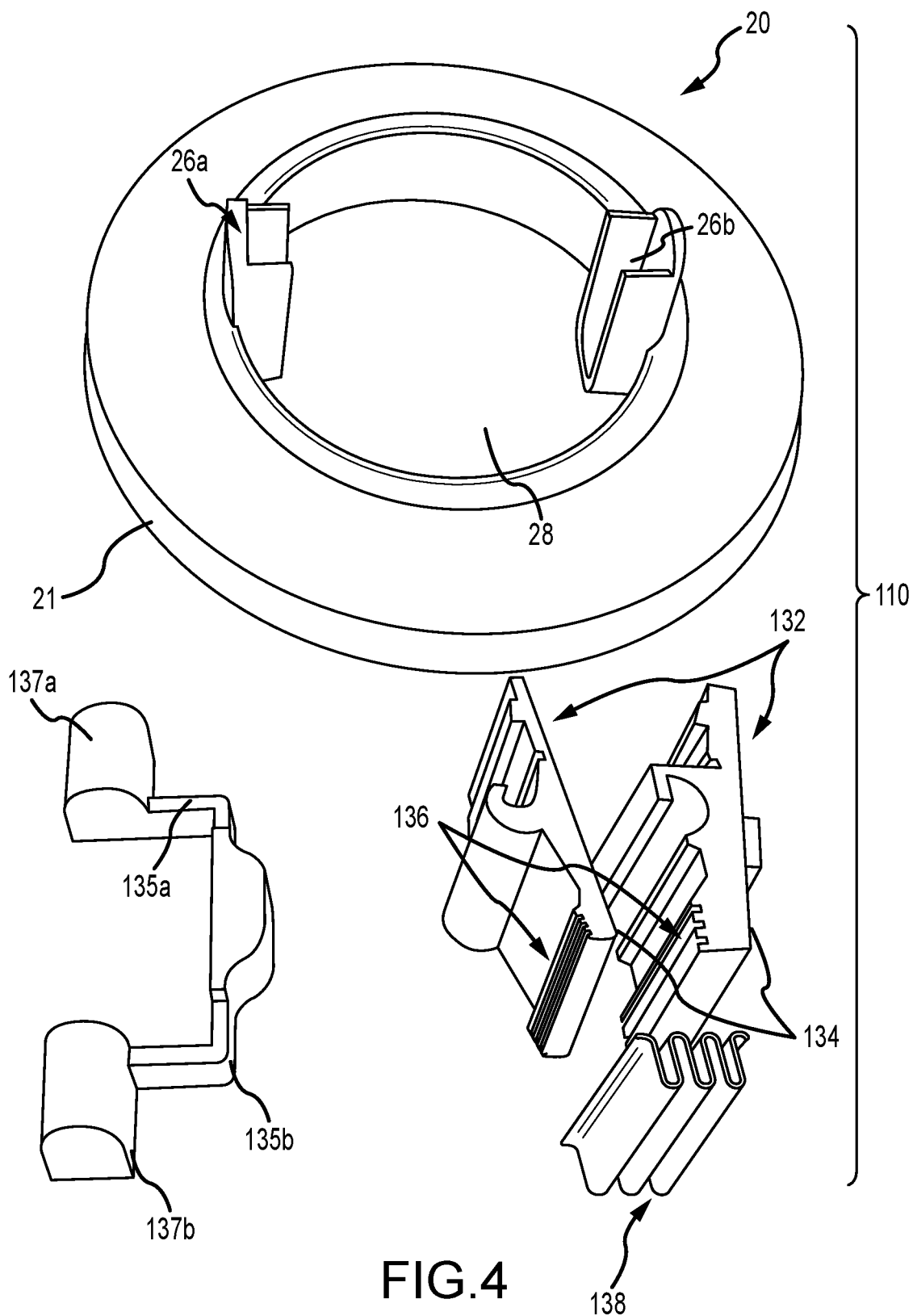
FIG. 4 is a perspective view of a disassembled version of the system of FIG. 3.

In operation, the clip (130) may be maintained in a first position, as illustrated in FIGS. 1 and 3, such as by spring (138). Food material is placed within the clip (130) by moving the clip (130) into a second position. Specifically, a user opens clip (130) by pressing handles (132) towards one another, causing the spring force of the spring (138) to be overcome and jaws (134) to move away from one another (not illustrated). Seaweed (e.g., Nori) or other suitable food material(s) may then be placed between the spaced apart jaws (134), after which the user releases the handles (132), causing the jaws (134) to be placed back into the first position. The food material(s) are gripped by jaws (134) of clip (130), such as by teeth (136).

If the system (110) is not already within the aquarium, the flotation base (20) is placed within aquarium. If the system (110) is already within the aquarium, the user simply lifts the clip (130) out of the flotation base (20), leaving the flotation base (20) within the aquarium. The user then places the food materials within the clip (130) as described above and then inserts the clip (130) into the flotation base (20), thereby causing the mated arrangement. The system (110) then moves freely about the aquarium with the food materials (e.g., seaweed) dangling therefrom. Accordingly, the exact place and location of where the aquatic food will reach the aquatic life is known (i.e., where the system (110) is located), enhancing the aquarium viewing experience of the users. Moreover, the system (110) generally floats freely around the aquarium via flotation base (20), so the food materials may be randomly distributed with each feeding, also enhancing the viewing experience of the users. Moreover, the handles (132) of clip (130) are located above the water level of the aquarium so that the clip may be inserted into and removed from base (20) by a user without contacting the water of the aquarium.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

The invention claimed is:

1. An aquarium feeding system (110) comprising:
   (a) a flotation base (20) adapted to float on water;
      (i) wherein the flotation base (20) comprises an outer perimeter (21) and an inner opening (28), wherein the inner opening (28) is concentric with the outer perimeter (21);
      (ii) wherein the outer perimeter (21) comprises an upper surface (22) and a lower surface (24);
   (b) a clip (130) adapted to be removably inserted into and removed from the inner opening (28) of the flotation base (20);
      (i) wherein, as inserted, an arm (135a) of the clip (130) sits on a portion of the upper surface (22) of the outer perimeter (21) of the flotation base (20), wherein the arm (135a) comprises an outer end (137a), wherein the outer end (137a) is configured to sit within a slot (26) of the flotation base (20); and
      (ii) wherein, as inserted, jaws (134) of the clip (130) are disposed at or below a plane corresponding to the lower surface (24) of the flotation base (20).

2. The aquarium feeding system (110) of claim 1, wherein the outer end (137a) comprises at least one planar side surface.

3. The aquarium feeding system (110) of claim 2, wherein the slot (26) comprises a corresponding planar side surface for mating with the planar side surface of the outer end (137a).

4. The aquarium feeding system (110) of claim 1, wherein the arm (135a) is a first arm, wherein the outer end (137a) is a first outer end, wherein the clip further comprises a second arm (135b) connected to the clip (130), wherein the second arm comprises a second outer end (137b), wherein the second outer end (137b) is adapted to sit within a second slot (26) of the flotation base (20).

5. The aquarium feeding system (110) of claim 4, wherein the first arm (135a) and the second arm (135b) are integral.

6. The aquarium feeding system (110) of claim 1, wherein the clip (130) comprises handles (132) integral with the jaws (134), wherein, as inserted, tops of the handles (132) of the clip (130) are disposed above a plane corresponding to the upper surface (22) to the flotation base (20).

7. The aquarium feeding system (110) of claim 1, wherein the arm (135a) of the clip (130) extends in a horizontal direction.

8. The aquarium feeding system (110) of claim 1, wherein the flotation base (20) is in the form of a torus, and wherein the inner opening (28) and the outer perimeter (21) define the torus.

* * * * *